United States Patent
Keh et al.

(10) Patent No.: US 7,270,465 B2
(45) Date of Patent: Sep. 18, 2007

(54) LIGHT GUIDE WITH AN INSERT MOLDED ATTACHMENT STRUCTURE FOR AN OPTICALLY ACTIVE ELEMENT

(75) Inventors: Kean Loo Keh, Penang (MY); Chin Hin Oon, Penang (MY); Chai Liang Loke, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 153 days.

(21) Appl. No.: 11/111,023

(22) Filed: Apr. 21, 2005

(65) Prior Publication Data

US 2006/0239034 A1    Oct. 26, 2006

(51) Int. Cl.
 *G02B 6/42* (2006.01)
(52) U.S. Cl. ............... 362/621; 362/630; 362/631; 362/26; 264/1.25; 349/65
(58) Field of Classification Search ............ 362/621, 362/630, 631, 26, 611, 612, 555; 257/98; 264/1.25; 349/65
See application file for complete search history.

(56) References Cited

U.S. PATENT DOCUMENTS

| 6,036,328 | A  | * | 3/2000 | Ohtsuki et al. ........... 362/612 |
| 6,270,236 | B1 | * | 8/2001 | Brussog ..................... 362/249 |
| 6,521,879 | B1 |   | 2/2003 | Rand et al. |
| 6,609,808 | B2 |   | 8/2003 | Chen |
| 2002/0030996 | A1 | * | 3/2002 | Sakakibara ............... 264/1.24 |
| 2004/0130019 | A1 | * | 7/2004 | Chen ........................ 257/723 |
| 2004/0207775 | A1 |   | 10/2004 | Min et al. |
| 2006/0007097 | A1 | * | 1/2006 | Ichikawa ................... 345/102 |

* cited by examiner

*Primary Examiner*—Jong-Suk (James) Lee
*Assistant Examiner*—Ismael Negron (57) ABSTRACT

A light system, includes a light guide, an attachment structure, and an optically active element. The light guide has first and second major surfaces and an edge surface. The attachment structure is insert molded to the light guide at the edge surface of the light guide, wherein the light guide is molded around at least a portion of the attachment structure. The optically active element is attached to the attachment structure.

20 Claims, 6 Drawing Sheets perspective
FIG.1 front
FIG.2A front
FIG.3A side
FIG.2B bottom FIG.2C side
FIG.3B bottom FIG.3C

| Insert mold an attachment structure and a light guide together at the edge surface of the light guide | —200 |

| Attach an optically active element to the attachment structure that is insert molded to the light guide at the edge surface | —202 |

LIGHT GUIDE WITH AN INSERT MOLDED ATTACHMENT STRUCTURE FOR AN OPTICALLY ACTIVE ELEMENT

BACKGROUND OF THE INVENTION

Liquid crystal displays (LCDs) require a backlight system to produce a visible image. An example backlight system for an LCD is a planar light guide that is edge-illuminated using a series of light emitting diodes (LEDs). In addition to the LEDs, a backlight system is sometimes equipped with an optical sensor that provides feedback (e.g., color and brightness) related to the light that is emitted from the backlight system.

LEDs and optical sensors are often attached to the planar light guide of a backlight system to form a single backlight component. The techniques used to attach LEDs and/or optical sensors to planar light guides have a direct effect on the size and cost of a backlight system. Because LCDs are commonly used in small consumer electronics devices, such as cell phones and personal digital assistants (PDAs), it is important to make backlight systems that are as compact and cost effective as possible.

SUMMARY OF THE INVENTION

A light system, such as a backlight system for an LCD, includes a light guide and an attachment structure that are insert molded together at an edge surface of the light guide and an optically active element (e.g., an LED and/or an optical sensor) attached to the attachment structure. By insert molding the attachment structure and the light guide together at an edge surface of the light guide, the optically active element can be efficiently attached at the edge of the light guide with minimal impact on the thickness and footprint of the backlight system.

Other aspects and advantages of the present invention will become apparent from the following detailed description, taken in conjunction with the accompanying drawings, illustrated by way of example of the principles of the invention.

BRIEF DESCRIPTION OF THE DRAWINGS

Throughout the description similar reference numbers may be used to identify similar elements.

DETAILED DESCRIPTION

Figure 1:
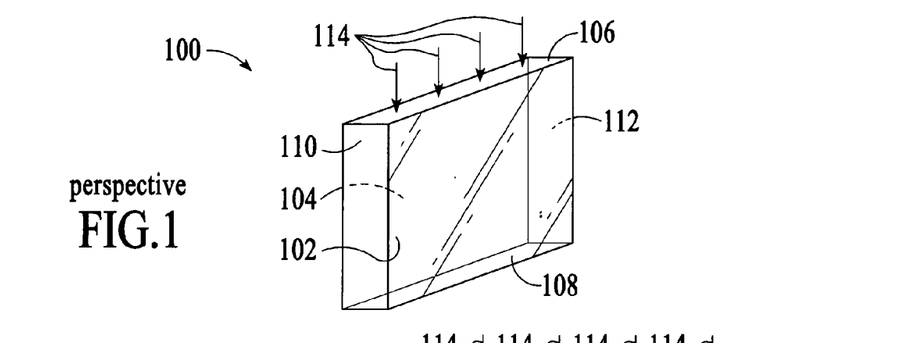
FIG. 1 depicts a perspective view of a light guide.

FIG. 1 depicts a perspective view of a light guide 100. The light guide has first and second major surfaces 102 and 104 and at least one edge surface. In the configuration of FIG. 1, the edge surface includes a top edge 106, a bottom edge 108, and side edges 110 and 112. The light guide is referred to generally as a "planar" light guide because the major surfaces 102 and 104 are much larger than the edge surfaces 106, 108, 110, and 112. The light guide is made of a transparent material such as a clear resin or plastic. The light guide can be formed by, for example, injection molding, transfer molding, or casting.

As depicted in FIG. 1, light 114 is typically injected into the light guide 100 at an edge. Various techniques, which are beyond the scope of this disclosure, may be used to cause the injected light to be emitted from at least one of the major surfaces of the light guide for use in backlighting an LCD.

In accordance with an embodiment of the invention, an attachment structure and a light guide are insert molded together at an edge surface of the light guide and an optically active element is attached to the attachment structure. By insert molding the attachment structure and the light guide together at an edge surface of the light guide, the optically active element can be efficiently attached at the edge of the light guide with minimal impact on the thickness and footprint of the light system. As used herein, the term "optically active element" is a device that produces and/or detects light. The term optically active element explicitly includes LEDs and optical sensors, but may include other elements as well.

An example of a technique for attaching an optical sensor to a planar light guide is described in detail with reference to FIGS. 2A-4 and an example of a technique for attaching LEDs to a planar light guide is described in detail with reference to FIGS. 5A-10.

Figure 2A:
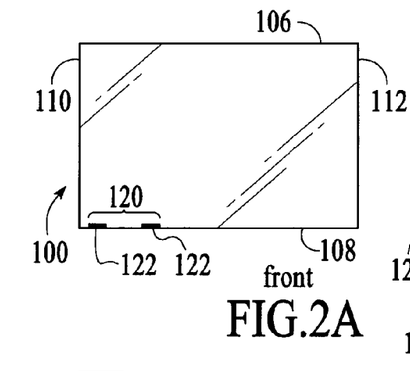
FIGS. 2A-2C depict front, side edge, and bottom edge views of an attachment structure and a light guide that are insert molded together at the bottom edge of the light guide.
Figure 2B:
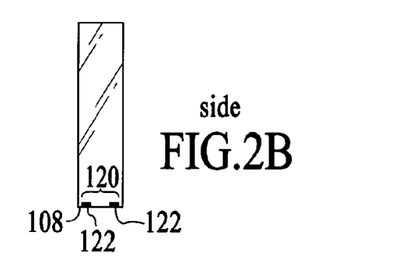
Figure 2C:
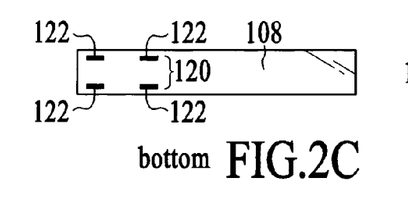

FIGS. 2A-2C depict various views of an attachment structure 120 and a light guide 100 that are insert molded together at the bottom edge 108 of the light guide. In the embodiment of FIGS. 2A-2C, the attachment structure includes four attachment points 122 that are insert molded into the light guide. In this embodiment, the attachment points are metallic structures that are compatible with soldering although other attachment structures are possible. FIG. 2A is a front view of the light guide that depicts two of the four attachment points of the attachment structure. As shown in FIG. 2A, the attachment points extend into the light guide as a result of the insert molding. FIG. 2B is a side edge view of the light guide that depicts two of the four attachment points. Again, the attachment points extend up into the light guide as a result of the insert molding. FIG. 2C is a bottom edge view of the light guide and all four of the attachment points. Although the four attachment points are insert molded into the light guide, the four attachment points have exposed portions that are used to attach an optical sensor. In an embodiment, the attachment structure may also include conductive metal traces connected to the attachment points, which provide electrical connections between the attachment points and an associated electrical system.

Figure 3A:
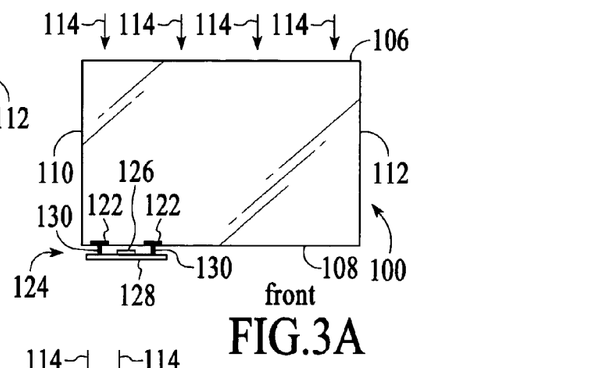
FIGS. 3A-3C depict a flip-chip packaged optical sensor that is attached to attachment points of the attachment structure from FIGS. 2A-2C.
Figure 3B:
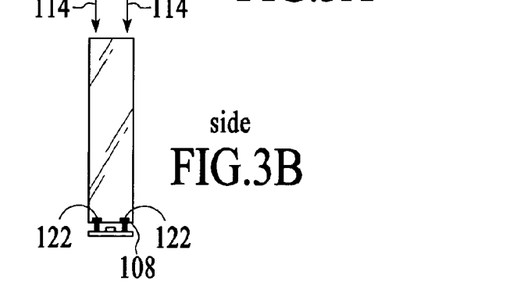
Figure 3C:
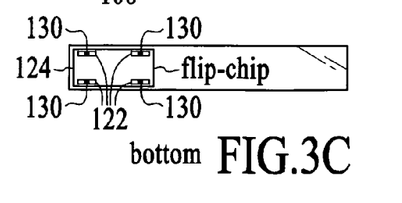

Once the attachment structure 120 has been insert molded to the light guide 100 as shown in FIGS. 2A-2C, an optical sensor can be attached to the attachment points 122 of the attachment structure. In an embodiment, a color optical sensor is packaged in a flip-chip type package. FIGS. 3A-3C depict a flip-chip packaged optical sensor 124 that is attached to the attachment points of an attachment structure. The flip-chip packaged optical sensor includes an optical sensor 126, a package body 128, and attachment pins 130 (e.g., solder bumps, solder pads). In the example of FIGS. 3A-3C, the attachment pins of the flip-chip packaged optical sensor are soldered to the attachment points 122 of the attachment structure to connect the flip-chip packaged optical sensor 124 to the light guide. The attachment points may also be used to form an electrical connection to a larger electrical system. The optical sensor is located with reference to the light guide to detect light that exits the light guide at an edge, in this case the bottom edge 100. FIG. 3A is a front view of the light system that depicts two of the four connections between the attachment structure and the flip-chip packaged optical sensor. FIG. 3B is a side edge view of the light system that depicts two of the four connections between the attachment structure and the flip-chip packaged optical sensor. FIG. 3C is a bottom edge view of the light system that depicts all four of the connections between the attachment structure and the flip-chip packaged optical sensor.

In an embodiment, multiple attachment structures are formed as leadframes on a strip, reel, or matrix. A strip, reel, or matrix manufacturing technique is then used to insert mold identical attachment structures to light guides in an efficient manner. The insert molded light guide/attachment structure combinations are then separated from each other for individual assembly and use.

Figure 4:
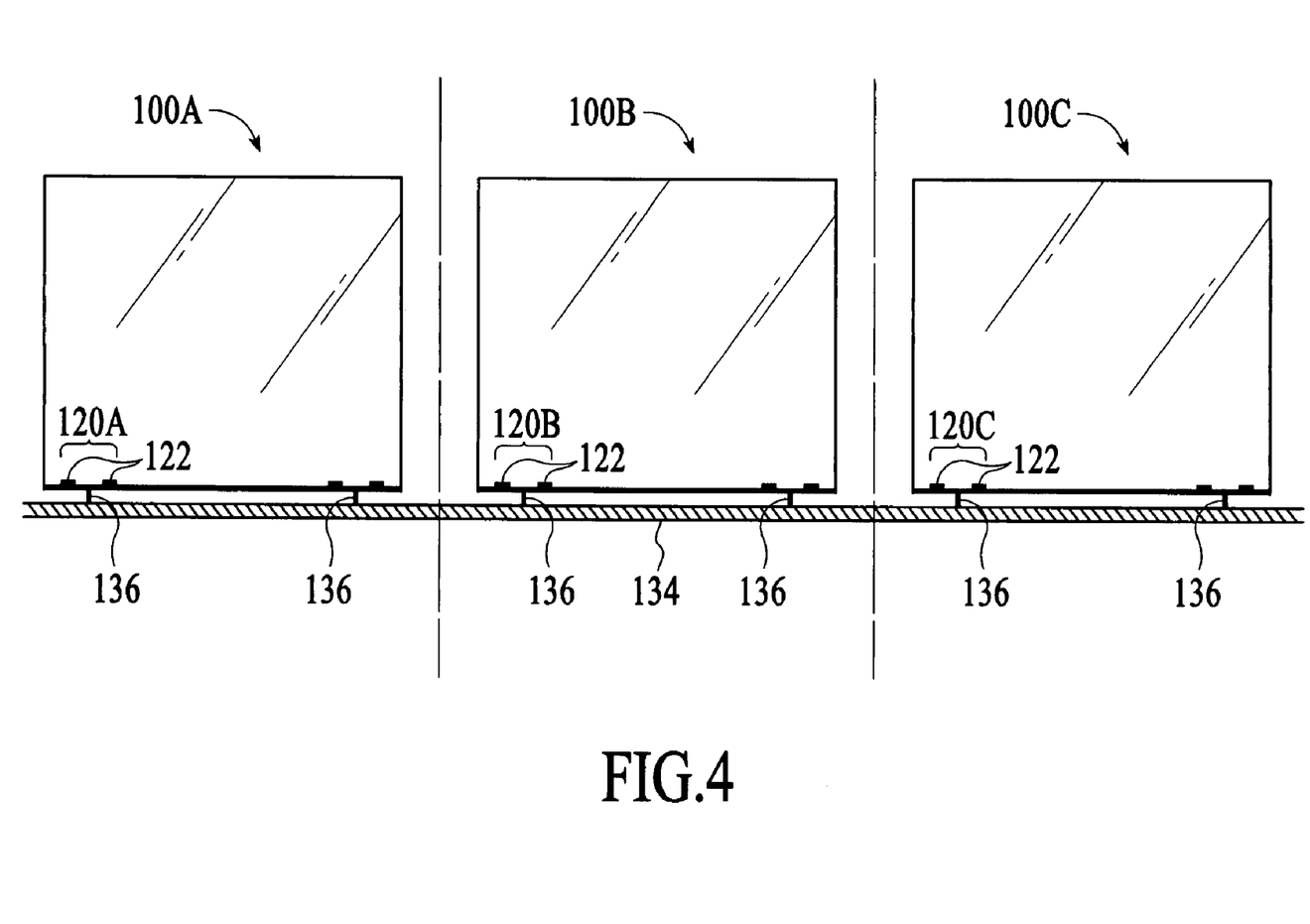
FIG. 4 depicts an example of three distinct attachment structures that are contained on a strip and insert molded to three distinct light guides.

FIG. 4 depicts an example of three distinct attachment structures 120A-120C that are contained on a strip 134 and insert molded to three distinct light guides 100A-100C. The insert molding takes place while the attachment structures are connected to the strip. In the example of FIG. 4, the attachment structures are leadframe structures that include portions (e.g., leadframe support guides 136) that need to be removed after insert molding. After the attachment structures are insert molded to the light guides as shown in FIG. 4, the light guide/attachment structure combinations are separated from each other at the dashed vertical lines. In the embodiment of FIG. 4, after separation, the strip and all exposed portions of the leadframe structures except the four attachment points are removed to leave the arrangement depicted in FIGS. 2A-2C.

Although a particular configuration of the attachment structure (120) is described with reference to FIGS. 2A-4, other configurations of the attachment structure are possible. In an embodiment, the attachment points 122 are typically laid out to match the input/output pins of a flip-chip package and it should be understood that more or less than four attachment points could be used. Additionally, although the optically active element described above is a color sensor, a different optically active element can be attached to the light guide using a similar technique.

Figure 5A:
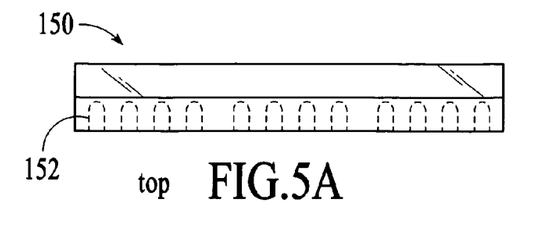
FIG. 5A is a top view of an attachment structure with reflector cups that is to be insert molded to a light guide at an edge surface of the light guide.
Figure 5B:
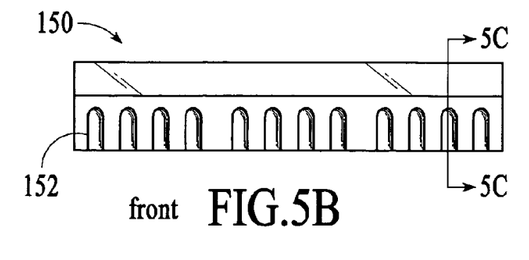
FIG. 5B is a front view of the leadframe from FIG. 5A.
Figure 5C:
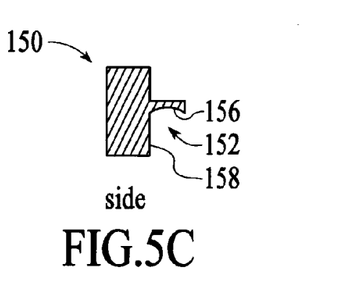
FIG. 5C is a side cutaway view of the leadframe from FIGS. 5A and 5B along line 5C-5C of FIG. 5B.

An example of a technique for attaching LEDs to a planar light guide is now described with reference to FIGS. 5A-10. FIG. 5A is a top view of an attachment structure 150 that is to be insert molded to a light guide at an edge surface of the light guide. In this embodiment, the attachment structure is formed from a metallic sheet. These types of structures are commonly referred to as leadframes because they include electrical connection points that can be connected to electrically conductive leads of LEDs. The attachment structure includes reflector cups 152 and may include leadframe support guides (not shown). In an embodiment, the reflector cups are stamped into the leadframe and the leadframe support guides may be formed by folding up metallic wings of the leadframe. As is described in more detail below, the leadframe support guides secure the leadframe to a strip, reel, or matrix structure during assembly. FIG. 5B is a front view of the leadframe 150 from FIG. 5A. The front view depicts the reflector cups 152. FIG. 5C is a side cutaway view of the attachment structure along line 5C-5C. In the example of FIGS. 5A-5C, the reflector cups 152 are quarter circles 156 with a slightly elongated edge 158. Although an exemplary reflector cup configuration is described with reference to FIGS. 5A-5C, other configurations are possible. Additionally, the attachment structure may not include reflector cups. The attachment structure may include other functional elements in addition to or independent of the reflector cups.

Figure 6A:
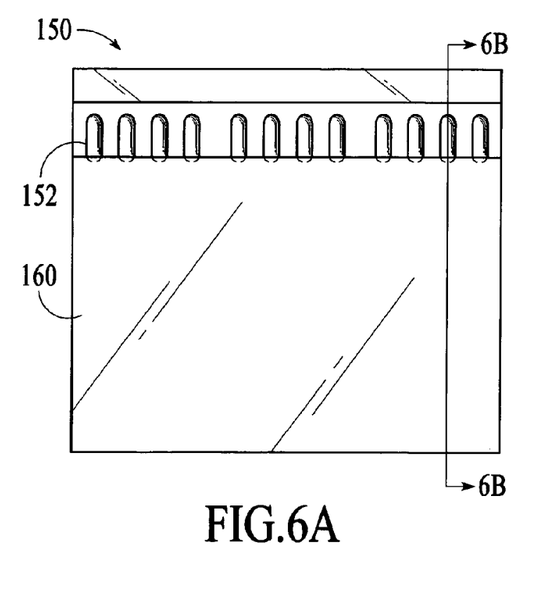
FIG. 6A is a front view of the attachment structure from FIGS. 5A-5C once it is insert molded to the light guide at an edge surface.
Figure 6B:
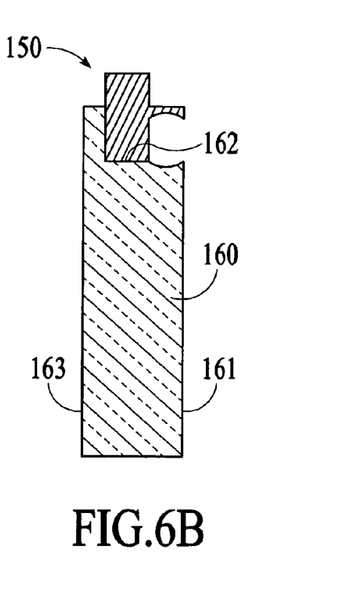
FIG. 6B is a side cutaway view along line 6B-6B of FIG. 6A of the attachment structure insert molded to the light guide.

In accordance with an embodiment of the invention, the attachment structure 150 and a light guide 160 are insert molded together at an edge surface of the light guide. FIG. 6A is a front view of the attachment structure 150 from FIGS. 5A-5C and the light guide 160 after the attachment structure and the light guide are insert molded together at an edge surface 162 of the light guide 160. FIG. 6B is a side view of the attachment structure 150 insert molded to a planar light guide 160 having major surfaces 161 and 163. In the embodiment of FIGS. 6A and 6B, a portion of the light guide is molded around the attachment structure to securely connect the attachment structure and the light guide. The exact configuration of the insert molded light guide and the attachment structure is not critical as long as the attachment structure and light guide are securely connected.

LEDs are attached to the attachment structure such that light from the LEDs is injected into the light guide at an edge surface. In a preferred embodiment, the LEDs are attached to the attachment structure after insert molding, although the LEDs could be attached to the attachment structure before insert molding. Techniques used to attach the LEDs to the attachment structure include gluing the LED die to a die attach pad and wire bonding. The attachment between the LEDs and the attachment structure includes both physical and electrical. The particular technique used to attach the LEDs to the attachment structure is not critical as long as the LEDs are physically secure and electrically connected. In an embodiment, silver epoxy is dispersed into the reflector cup of the attachment structure and the LED is placed onto the silver epoxy. The LEDs are positioned relative to the reflector cups such that the reflector cups redirect some of the emitted light into the light guide at the edge surface of the light guide.

Figure 7A:
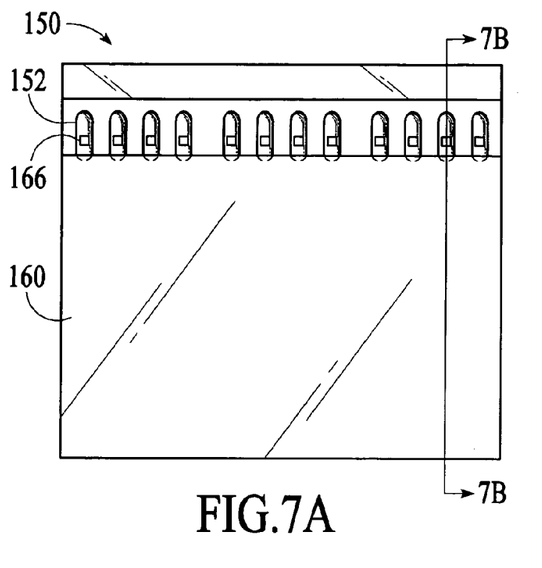
FIG. 7A is a front view of the insert molded attachment structure and light guide from FIG. 6A with LEDs connected to the attachment structure at the reflector cups.
Figure 7B:
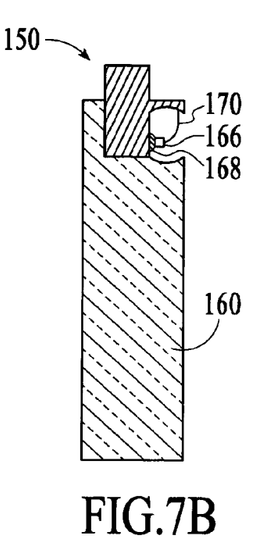
FIG. 7B is a side cutaway view along line 7B-7B of FIG. 7A of the insert molded attachment structure and light guide with the LEDs connected to the attachment structure.

FIG. 7A is a front view of the attachment structure 150 and insert molded light guide 160 from FIG. 6A with LEDs 166 connected to the attachment structure at the reflector cups 152. FIG. 7B is a side cutaway view along line 7B-7B of the light guide 160 with an LED 166 connected to the attachment structure. As depicted in FIG. 7B, the LED is attached to the attachment structure by a conductive epoxy 168. The LEDs are also electrically connected to the attachment structure by a wire bond 170.

Figure 8A:
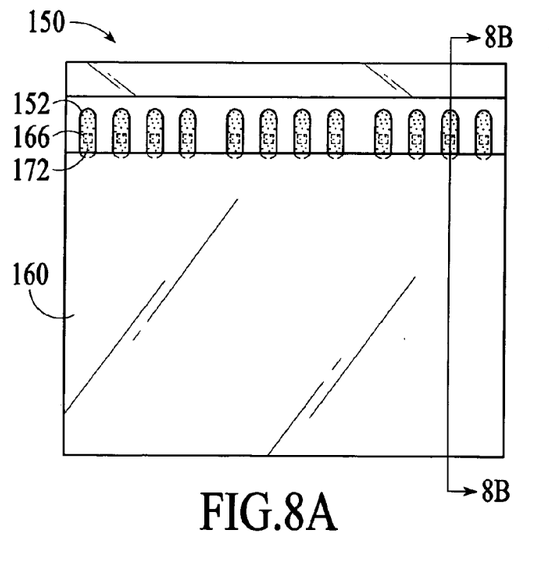
FIG. 8A is a front view of the system from FIG. 7A after an encapsulant has been applied into the reflector cups and over the LEDs.
Figure 8B:
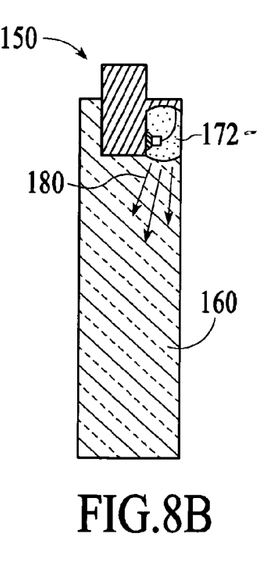
FIG. 8B is a side cutaway view along line 8B-8B of FIG. 8A that depicts the encapsulant applied into the reflector cups and over the LEDs.

After the LEDs 166 are attached to the attachment structure 150, an encapsulant can be applied into the reflector cups to encapsulate the LEDs. Encapsulating the LEDs protects the LEDs and the electrical connections from being damaged. The encapsulant can be a transparent material such as a clear epoxy resin that is dispensed as a viscous material and cured into a solid. FIG. 8A is a front view of the system from FIG. 7A after an encapsulant 172 has been applied into the reflector cups 152 and over the LEDs 166. FIG. 8B is a side cutaway view along line 8B-8B of the system that depicts the encapsulant applied into the reflector cups and over the LEDs. As shown in FIGS. 8A and 8B, the LEDs are completely encapsulated between the light guide, the attachment structure, and the encapsulant.

Figure 9:
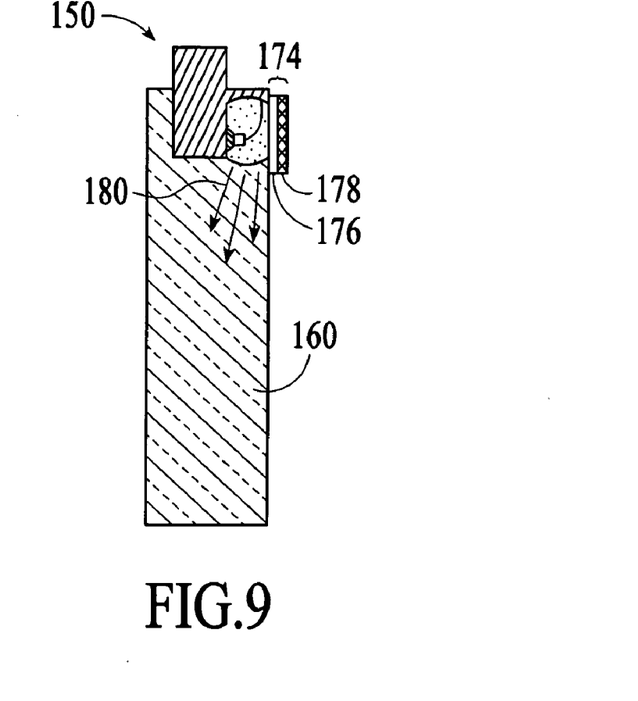
FIG. 9 depicts a side cutaway view along line 8B-8B of FIG. 8A that depicts a light encapsulation structure formed over the reflector cup.

In an embodiment, a light encapsulating structure can be placed over the encapsulant and the reflector cup area to reflect more of the light 180 into the light guide and to prevent light leakage. An example of a light encapsulating structure 174 is depicted in FIG. 9. In the embodiment of FIG. 9, the light encapsulating structure includes a reflective layer 176 to reflect light towards the edge surface of the light guide and an opaque layer 178 to prevent light leakage.

As described above with reference to FIG. 4, multiple attachment structures that are used for LED attachment can be formed on a strip, reel, or matrix. With multiple attachment structures formed on a strip, reel, or matrix, strip, reel, or matrix manufacturing techniques can be used to insert mold multiple light guide/attachment structure combinations in an efficient manner.

Figure 10:
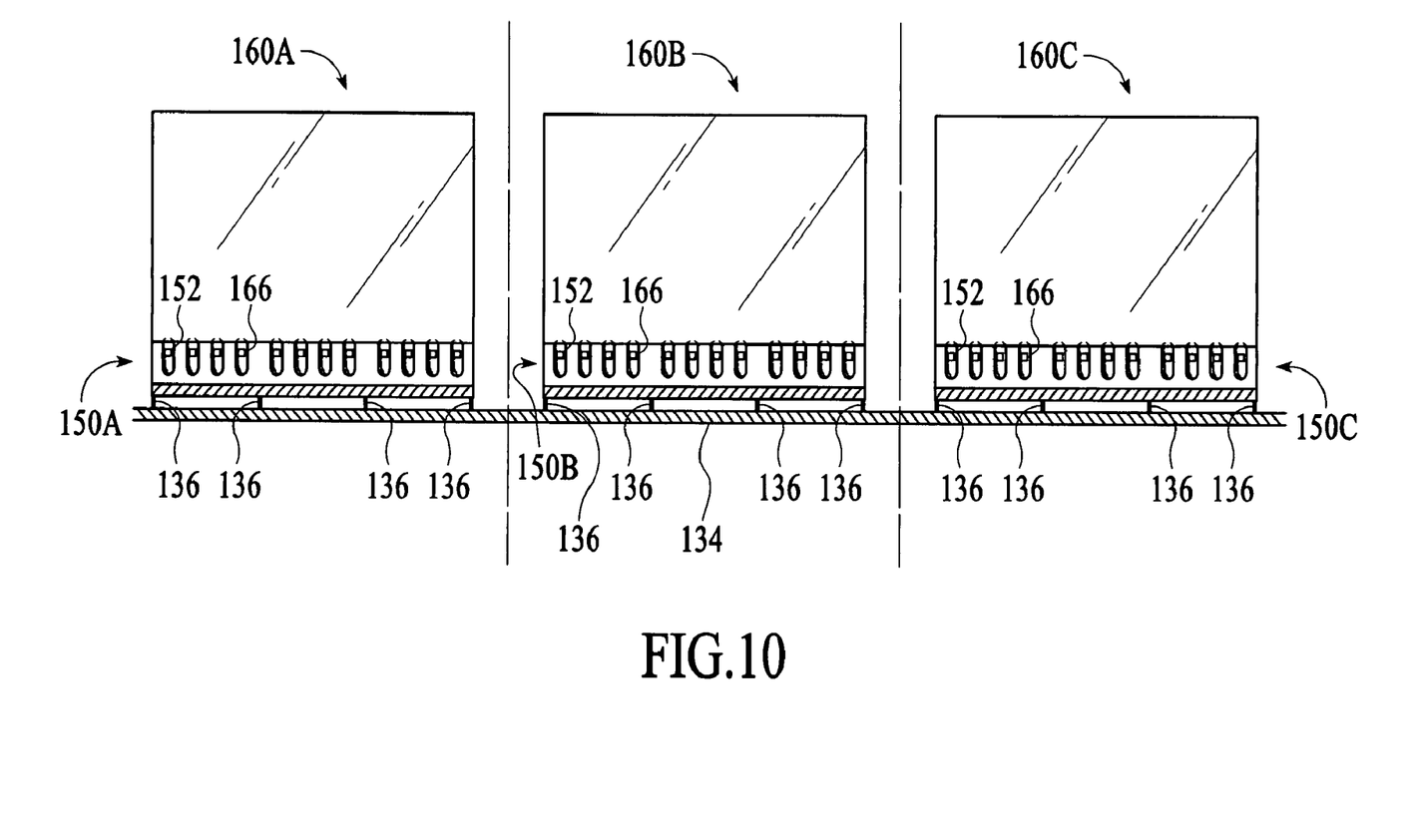
FIG. 10 depicts an example of three distinct attachment structures that are contained on a strip and insert molded to three distinct light guides.

FIG. 10 depicts an example of three distinct and identical attachment structures 150A-150C that are contained on a strip 134 and insert molded to three distinct light guides 160A-160C. In the example of FIG. 10, the attachment structures are leadframe structures that include stamped reflector cups 152 as described above with reference to FIGS. 5A-9. After the attachment structures are insert molded to the light guides, the LEDs 166 are attached to the attachment structure. Once the LEDs are attached to the attachment structure, the light guide/attachment structure/ LED combinations are separated from each other at the dashed vertical lines. In the embodiment of FIG. 10, after separation, extra portions of the strip (e.g., leadframe support guides 136) are removed to leave the arrangement depicted in FIGS. 6A and 6B.

Although a particular configuration of the attachment structure 150 and light guide 160 are described with reference to FIGS. 5A-10, other configurations of the attachment structure and light guide are possible. Additionally, although the optically active element described above is a color sensor, a different optically active element can be attached to the light guide using a similar technique.

Figure 11:
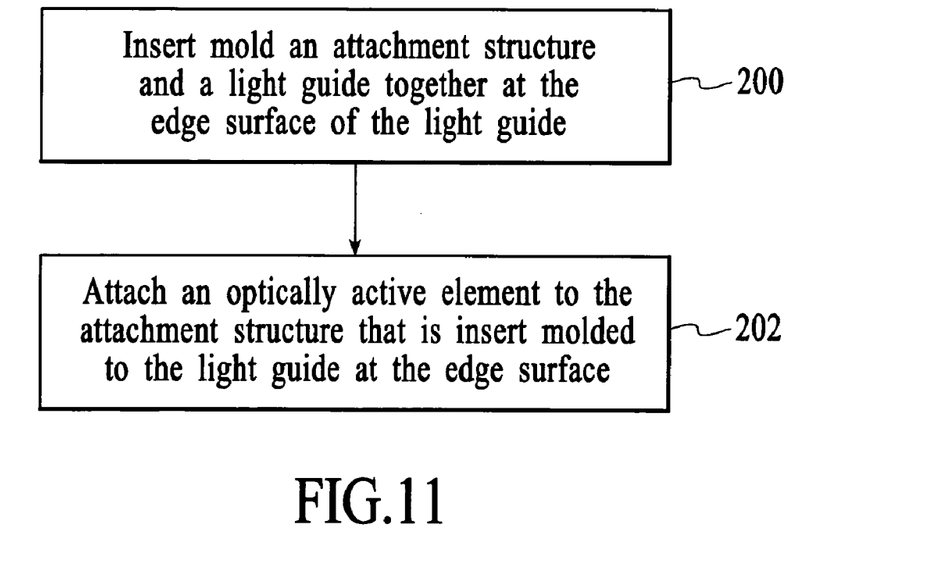
FIG. 11 depicts a process flow diagram of a method for forming an optical system that includes a light guide, an attachment structure, and an optically active element in accordance with the invention.

FIG. 11 depicts a process flow diagram of a method for forming an optical system that includes a light guide and an optically active element in accordance with the invention. At block 200, an attachment structure and a light guide are insert molded together at the edge surface of the light guide.

At block 202, an optically active element is attached to the attachment structure that is insert molded to the light guide at the edge surface.

Insert molding techniques include a resin or other molding compound being injected into a mold. Typically, insert molding involves high pressure to force the molding compound into the mold. As used herein, insert molding two elements together refers to any form of curing a molding compound around another finished part to create a single connected element.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A light system comprising:
   a light guide having first and second major surfaces and an edge surface;
   an attachment structure insert molded to the light guide at the edge surface of the light guide, wherein the light guide is molded around at least a portion of the attachment structure; and
   an optically active element attached to the attachment structure.

2. The light system of claim 1 wherein the attachment structure comprises exposed attachment points configured for attachment to the optically active element.

3. The light system of claim 1 wherein the attachment structure comprises metallic attachment points.

4. The light system of claim 3 wherein the optically active element is a color sensor that is packaged in a flip-chip package and soldered to the metallic attachment points of the attachment structure.

5. The light system of claim 1 wherein the optically active element is a light emitting diode (LED).

6. The light system of claim 5 wherein the attachment structure comprises a reflective element configured to reflect light from the LED into the light guide at the edge surface.

7. The light system of claim 5 wherein the attachment structure comprises a leadframe, wherein the LED is electrically connected to the leadframe.

8. The light system of claim 5 wherein the attachment structure comprises a reflector cup configured to reflect light from the LED into the light guide at the edge surface.

9. The light system of claim 8 further comprising a transparent encapsulant formed in the reflector cup and over the LED which at least partially encapsulates the LED.

10. The light system of claim 9 further comprising an encapsulating structure formed over the transparent encapsulant and the reflector cup.

11. A method for forming an optical system that includes a light guide and an optically active element, wherein the light guide has first and second major surfaces and an edge surface, the method comprising:
    insert molding an attachment structure and the light guide together at the edge surface of the light guide; and
    attaching an optically active element to the attachment structure that is insert molded to the light guide at the edge surface.

12. The method of claim 11 wherein the optically active element is a color sensor.

13. The method of claim 11 wherein the optically active element is a light emitting diode (LED).

14. The method of claim 11 wherein the attachment structure is a leadframe structure.

15. The method of claim 11 wherein the optically active element is an LED and wherein the leadframe structure comprises reflector cups configured to reflect light from the LED into the light guide at the edge surface.

16. The method of claim 11 wherein insert molding the attachment structure and the light guide together at the edge surface comprises insert molding a plurality of connected attachment structures in strip, reel, or matrix form at edge surfaces of a plurality of light guides.

17. The method of claim 16 further comprising separating the connected attachment structures before attaching optically active elements.

18. The method of claim 16 further comprising separating the connected attachment structures after attaching optically active elements.

19. A light system comprising:
a light guide having first and second major surfaces and an edge surface;
a leadframe insert molded to the light guide at the edge surface of the light guide, wherein the light guide is molded around at least a portion of the leadframe; and
an optically active element attached to the leadframe.

20. The light system of claim 19 wherein the leadframe structure is connected to other identical leadframe structures in a strip, reel, or matrix configuration.

* * * * *